United States Patent [19]

[11] 3,851,106

[45] Nov. 26, 1974

Jacobaeus

[54] METHOD FOR INCREASING IN A SIGNAL WITH A GIVEN BAND WIDTH THE AMOUNT OF INFORMATION TRANSFERRED PER TIME UNIT

[75] Inventor: Anton Christian Jacobaeus, Stockholm, Sweden

[73] Assignee: Telefonaktiebolaget L. M. Ericsson, Stockholm, Sweden

[22] Filed: June 29, 1973

[21] Appl. No.: 374,908

[30] Foreign Application Priority Data

July 19, 1972 Sweden .............................. 9500/72

[52] U.S. Cl..... 179/15 AP, 179/15 BY, 179/15 BW

[51] Int. Cl. .............................................. H04j 3/04

[58] Field of Search...... 179/15 AP, 15 BY, 15 BW, 179/15.55; 325/38, 39

[56] References Cited

UNITED STATES PATENTS 2,963,551 12/1960 Schreiber ...................... 179/15 BW

*Primary Examiner*—Ralph D. Blakeslee
*Attorney, Agent, or Firm*—Hane, Baxley & Spiecens

[57] ABSTRACT

The invention relates to a method for reducing the redundancy in a signal information by replacing the redundant information with a code which indicates that such information has appeared and shall be reconstructed at the receiving terminal.

10 Claims, 9 Drawing Figures a

| | | | | | | | | |
|---|---|---|---|---|---|---|---|---|
| n | 1 | 2 | 3 | 4 | 5 | ---- | 119 | 120 |
| m | 0 | 1 | 0 | 1 | 0 | ---- | 0 | 1 |

b

| | | | | | | |
|---|---|---|---|---|---|---|
| n | 1 | 2 | 3 | 4 | 5 | ---- |
| m | 0 | 0XXXXXXXX | 1XXXXXXXX | 1 | 1XXXXXXXX | ---- |

METHOD FOR INCREASING IN A SIGNAL WITH A GIVEN BAND WIDTH THE AMOUNT OF INFORMATION TRANSFERRED PER TIME UNIT

The invention relates to a method for increasing in a signal with a given band width the amount of information transferred per time unit.

It is known that information transmission normally implies a certain degree of redundancy of redundance for example thereby that in speech transmission the transmission medium is used continuously disregarding the natural pauses in the speech. A known method for reducing this redundance is called TASI (Time Assignment Speech Interpolation) according to which method a number of signal carrying channels are scanned to determine whether speech signals appear or not and a signal carrying channel is connected to a transmission medium only during the time as its speech signal appears. During the speech pauses the connection of the signal carrying channel to the transmission medium is broken so that the latter then can be used for another channel in which a speech signal appears.

Another known method for reducing the redundance refers to TV-transmission and is based on the fact that the light intensity is changed relatively infrequently for picture elements that are scanned in succession. In principle the method implies that the velocity of the line sweep is varied in dependence on the change per time unit in the amplitude of the video signal as it is described for example in the publication "Communication Theory" of Willis Jackson, London 1953.

The idea of the present invention is to achieve a further improvement in reducing the redundance in a signal information, the redundant information itself not being transferred but only a code which indicates that such information has appeared and shall be reconstructed at the receiving terminal.

The invention can be used for speech signal transmission as well as TV-signal transmission and is defined in the appended claims.

Figures 1, 2:
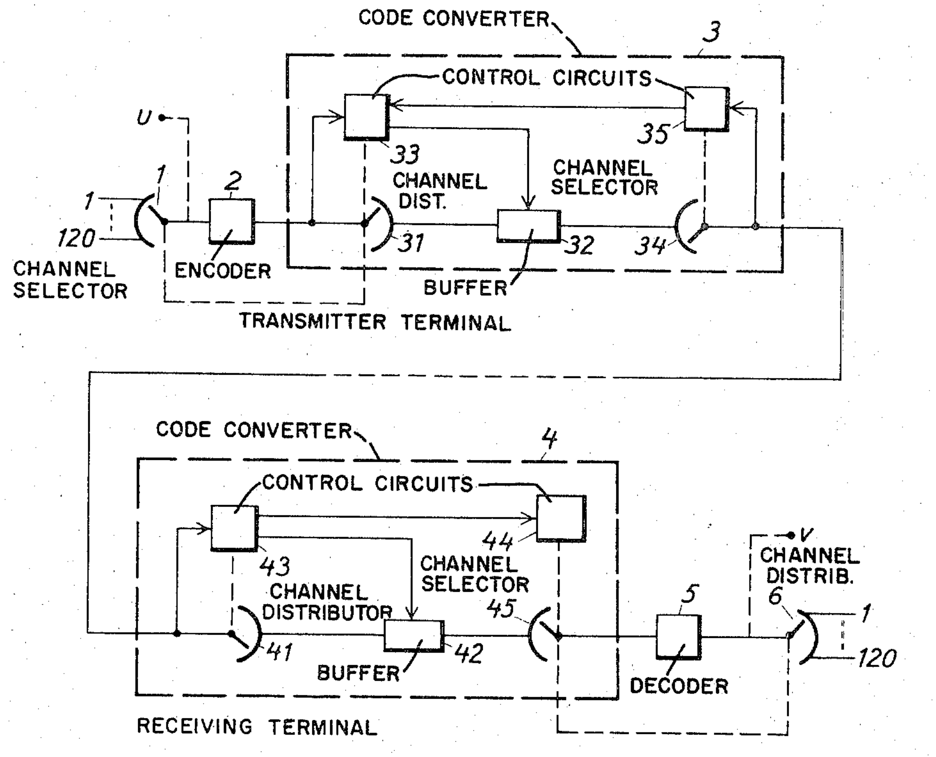
Figure 3:
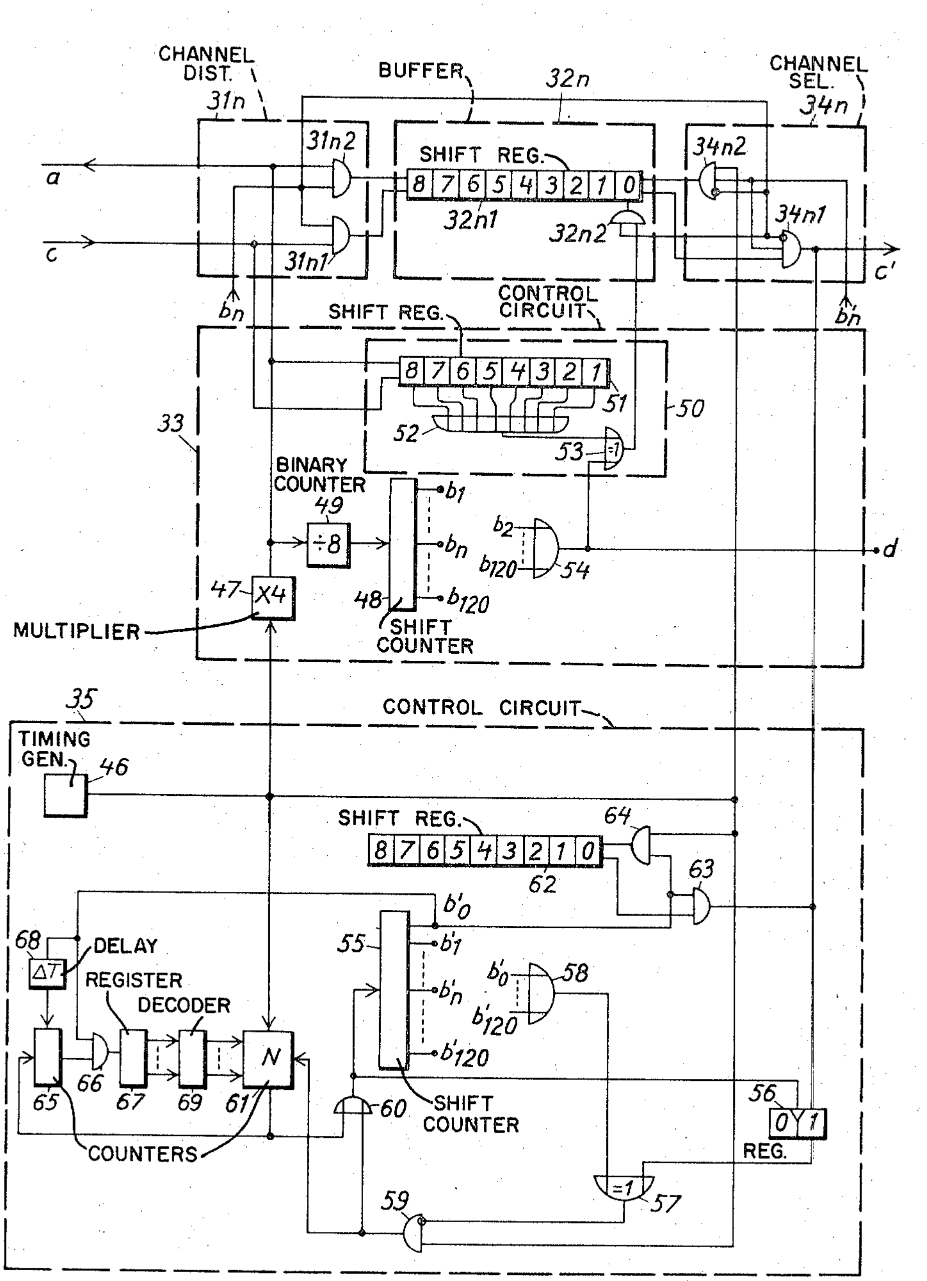
Figure 4:
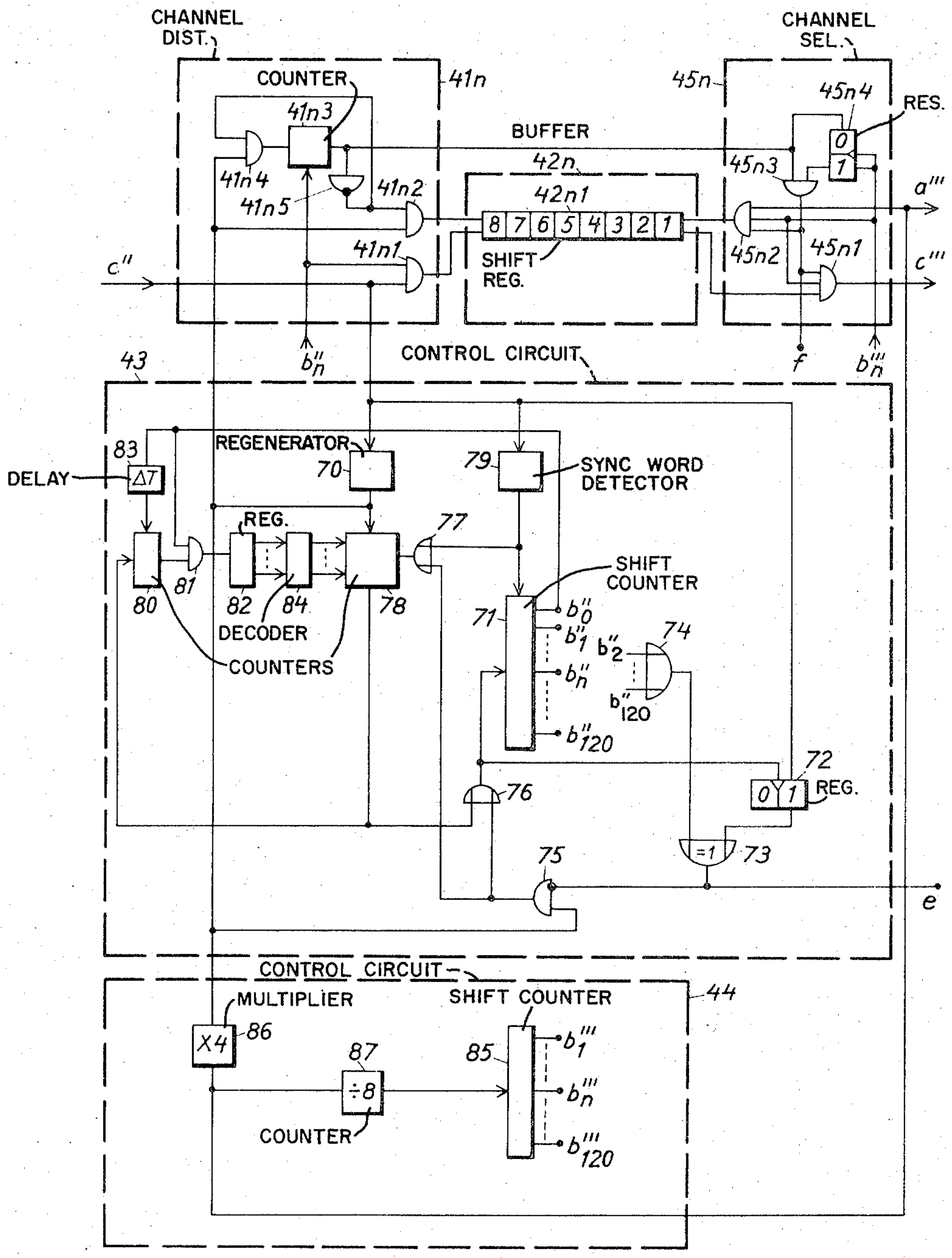
Figure 5:
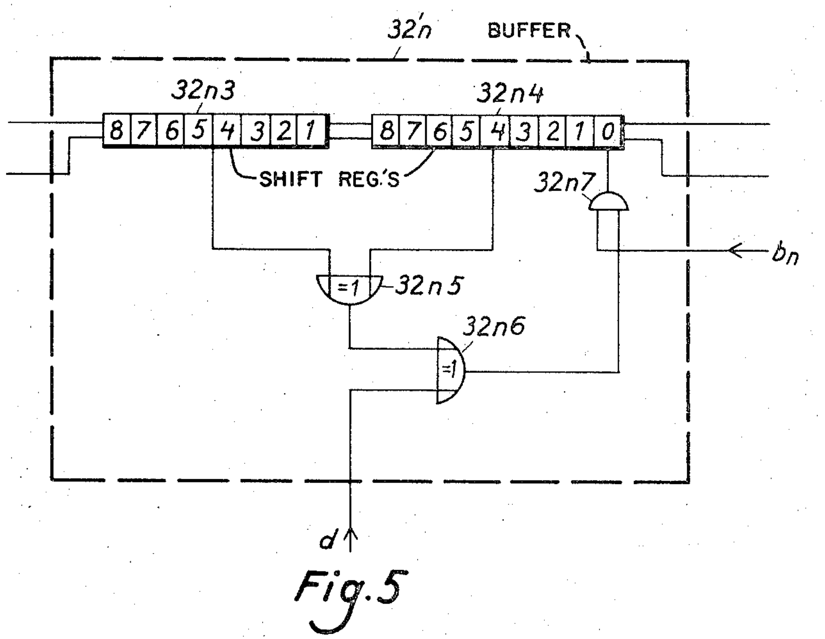
Figure 6:
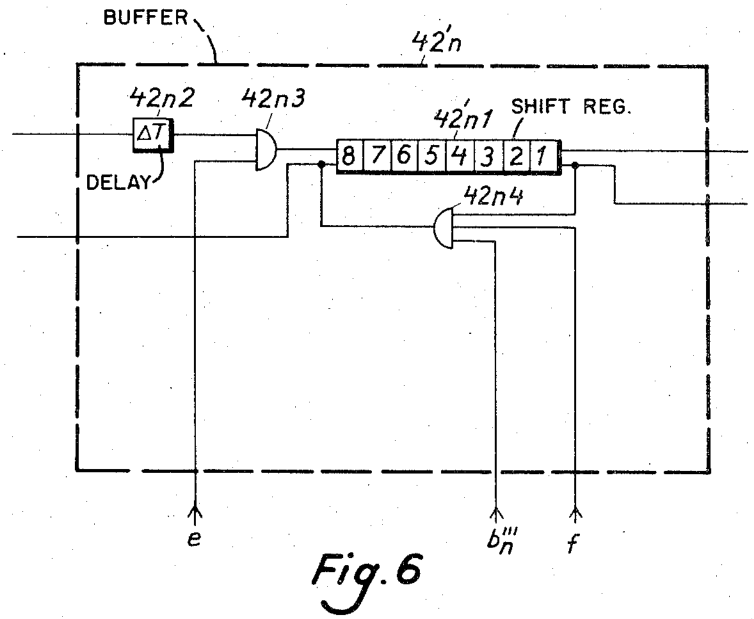
Figure 7:
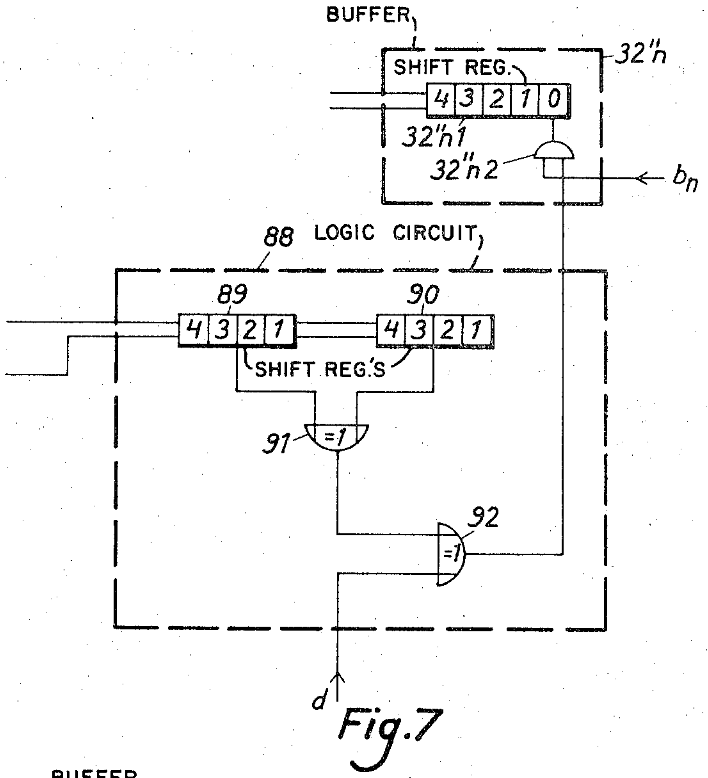
Figure 8:
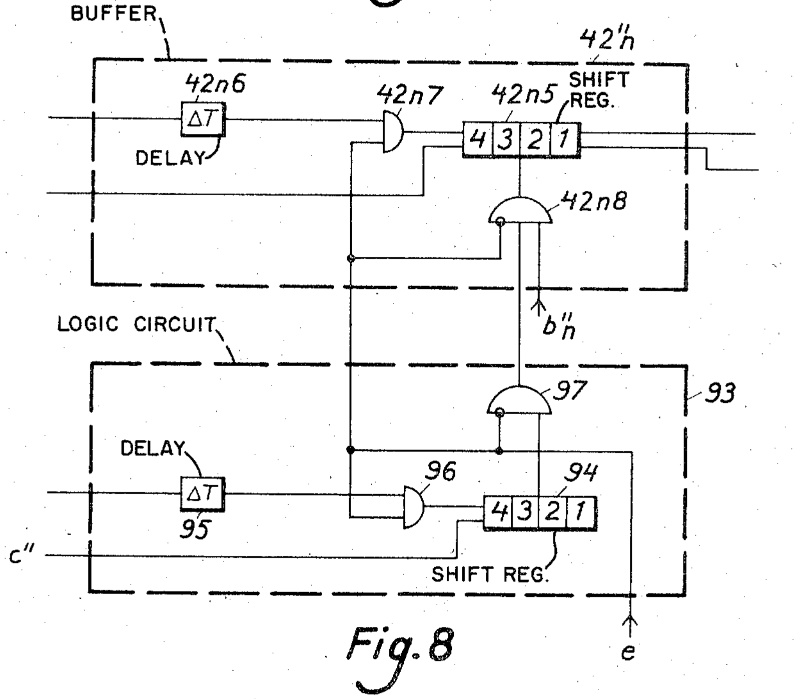
Figure 9:
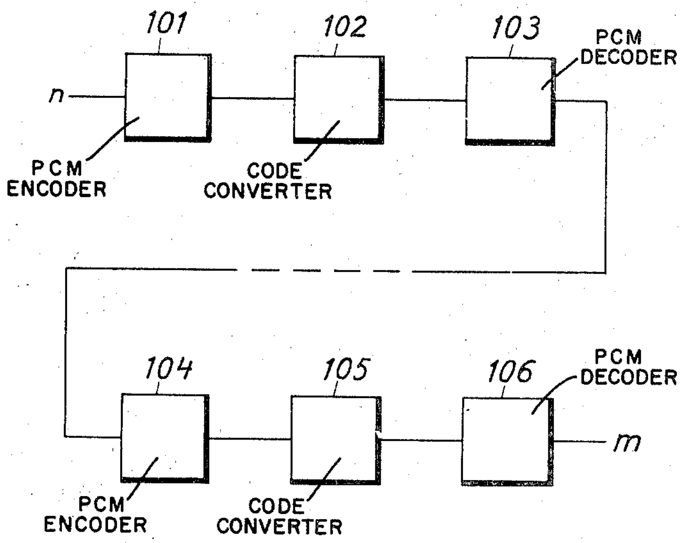

The invention will now be described more in detail by means of some embodiments with reference to the accompanying drawings, in which FIG. 1 is a diagram which shows a signal pulse train for an information transmission according to the principle of the invention, FIG. 2 is a block diagram of a system consisting of a transmitting terminal and a receiving terminal capable of achieving an information transmission according to FIG. 1, FIG. 3 and 4 show logic diagrams of a transmitter and a receiver respectively according to the block diagram in FIG. 2, FIG. 5 and 6 show a modification of the logic diagrams in FIG. 3 and 4, FIG. 7 and 8 show a further modification of the logic diagrams in FIG. 3 and 4 and FIG. 9 shows a modification of the block diagram in FIG. 2.

To achieve an information transmission according to the principle of the invention each channel in a PCM-system, which according to the example has 120 channels per frame is provided with a binary marking bit in such a way that for example in channels with odd serial numbers the marking bit is given the nominal value 0 and in channels with even serial numbers the marking bit is given the nominal value 1 as it is shown in line a in FIG. 1, where the channels and the marking bits are denoted with n and m respectively. The channels are scanned cyclically and are divided with regard to their information content into two categories, a first category which has redundant information and another category which has not-redundant information. The channel information content is defined as redundant if it corresponds to zero voltage alternatively, if it in relation to the last channel scanned does not include any new information as it will be explained more in detail below with reference to a first and a second application of the invention respectively.

The transmission of the channels occurs in such a way that in channels of the first category the redundant information is not transferred but only the marking bit with its nominal value, while in channels of the second category the marking bit is shifted to be transferred with a complementary value to its nominal value and is followed by the not-redundant information. Line *b* in FIG. 1 shows an example of this procedure when 8-bits PCM-coding is used and when it is assumed that the channels 2, 3 and 5 have not-redundant information content while the channels 1 and 4 have redundant information.

The marking bit pattern makes it possible to reconstruct the original signal at the receiving terminal and serves the purpose to increase for a given band width the amount of information that is transferred per time unit in the PCM-system. If it is assumed for example that in the transmission of speech information on the average only a quarter of the channels of the PCM-system have not-redundant information, 8-bits PCM-coding will require only $0,25 \times 9 + (1 - 0,25) \times 1 = 3$ bit positions per channel to be compared with the original 8 bit positions per channel.

FIG. 2 shows a block diagram of a transmission system for telephone signals, in which the principle of the invention has been applied. At a transmitting terminal telephone signals from according to the example 120 incoming channels are fed through a channel selector 1 to a PCM-encoder 2, the output signal of which is transferred to a code converter 3 which is equipped with a buffer and from which a PCM-flow is transmitted. The PCM-flow is received at a receiving terminal by a code converter 4 which is equipped with a buffer and is fed from the code converter 4 to a PCM-decoder 5, the output signal of which is brought to a channel distributor 6 to be fed to 120 outgoing channels.

The code converter 3 at the transmitting terminal includes a channel distributor 31 which is connected to the PCM-encoder 2 in order to distribute its output signal among a number of shift registers in a buffer 32, said number corresponding to the number of incoming channels. To the PCM-encoder 2 is further connected a control circuit 33, the function of which is to determine whether the words supplied from the PCM-encoder 2 have redundant or notredundant information content and to indicate the information content by inserting the previously mentioned marking bit in the first output bit position in the respective shift registers of the buffer 32. The control circuit 33 generates also pulses to synchronously step forward the channel selector 1 and the channel distributor 31.

The output from the shift registers of the buffer 32 is taken through a channel selector 34 which determines from which of the shift registers the output is to be taken. The channel selector 34 is stepped forward by a second control circuit 35 which examines the marking bits in the words supplied from the shift registers of the buffer 32 in order to determine whether the words in the respective shift registers have redundant or not-redundant information content. If a word has not-redundant information content it is supplied together with its marking bit while if a word has redundant information content only its marking bit is supplied whereupon the next shift register immediately is connected for output.

The logical circuit 35 includes a bit timing generator, the bit timing pulses of which control the output of the contents of the shift registers in the buffer 32 to the outgoing line of the transmitting terminal. The frequency of the bit timing generator is multiplied in the control circuit 33 with a selected factor, according to the example 4, in order to produce bit timing pulses which control the input of PCM-words from the PCM-encoder 2 to the buffer 32.

The code converter 4 at the receiving terminal includes a channel distributor 41 which distributes the arriving PCM-flow between a number of shift registers in a buffer 42 said number corresponding to the number of channels at the transmitting terminal. The code converter 4 includes furthermore a third control circuit 43 which is fed with the incoming PCM-flow and which examines the received marking bits to determine if these are followed by PCM-words containing information or not and with the aid of this information step forward the channel distributor 41 in synchronism with the channel selector 34 at the transmitting terminal. When a marking bit is received without any accompanying information in a following PCM-word, the control circuit 43 provides that an information corresponding to the information of the excluded PCM-word is inserted into the buffer 42.

The PCM-flow incoming through the channel distributor 41 is fed into the shift registers of the buffer 42 under control of bit timing pulses from a bit timing generator in the control circuit 43. The frequency of the bit timing generator is multiplied in the same way as in the control circuit 33 at the transmitting terminal in a fourth control circuit 44 with said selected factor according to the example 4 in order to produce on the one hand bit timing pulses which control the output of the PCM-words that are stored in the shift register of the buffer 42 through a channel selector 45 to the PCM-decoder 5, the output signal of which is fed to the channel distributor 6 and on the other hand pulses which step forward the channel selector 45 and the channel distributor 6 in synchronism with the channel selector 1 and the channel distributor 31 at the transmitting terminal.

FIG. 3 shows a logic diagram of the code converter 3 at the transmitting terminal in the block diagram in FIG. 2. In the previously mentioned control circuit 35 a bit timing generator 46 is included, the frequency of which is multiplied by a factor 4 in the likewise previously mentioned control circuit 33 by means of a frequency multiplicator 47. The PCM-encoder 2 which is not shown in FIG. 3 is fed via a line *a* with bit timing pulses from the frequency multiplicator 47. The output signal of the PCM-encoder 2 is received via a line *c* and the information from each incoming channel is supplied through an AND-circuit 31 *n*1 belonging to the shift register 32 *n*1 to a separate shift register 32 *n*1 in a buffer unit 32 *n*, that according to the example contains altogether 120 buffer units. A control input of the AND-circuit 31 *n*1 is connected to an output $b_n$ in a channel counter 48 which is stepped forward by means of the bit timing pulses from the frequency multiplicator 47 through a binary counter 49 counting to eight and which according to the example has 120 outputs $b_{1\text{-}120}$ which in sequential order are activated when the channel counter 48 is stepped forward. Each shift register 32 *n*1 is provided with an AND-circuit 31 *n*2 and receives, through the same the bit timing pulses from the frequency multiplicator 47 in order to control the input of the signal from the PCM-encoder 2, a control input of the AND-circuit 31 *n*2 being activated of the output $b_n$ of the channel counter 48.

In the control circuit 33 a logic circuit 50 common for all buffer units 32 n is arranged, in which the PCM-words received from the input *c* are fed into a shift register 51 simultaneously with their registering into the buffer units 32 *n*. The purpose of the shift register 51 is to determine whether the information content in a received PCM-word corresponds to zero-voltage or not. This is achieved by means of an OR-circuit 52 which is connected to all the bit positions of the shift register 51 and which produces an output signal, if at least one of the bits in a received PCM-word has the binary value 1. The output signal from the OR-circuit 52 is fed to a first input of an exclusive-OR-circuit 53, a second input of which obtains through an OR-circuit 54 an activating signal upon activation of the even outputs of the channel counter 48. As previously mentioned channels with even order numbers shall be assigned a marking bit with the binary value 0, while channels with even order numbers shall be assigned a marking bit with the binary value 1, provided that their respective PCM-words correspond to zero-voltage, no output signal being obtained from the OR-circuit 52 and the output signal of the OR-circuit 54 being forwarded without change to the output of the exclusive-OR-circuit 53. For such PCM-words which correspond to a voltage-level that differs from zero-voltage the OR-circuit 52 delivers an output signal which on the output of the exclusive-OR-circuit 53 will shift the binary value in the output signal of the OR-circuit 54, so that a complementary value to the binary value of the latter is obtained.

According to the example the PCM-words supplied from the PCM-encoder have 8 bit positions and the shift registers 32 *n*1 have 9 bit positions, the marking bit being registered into the bit positions, from which the output first is taken. The marking bit is registered from the output of the exclusive-OR-circuit 53 through an AND-circuit 32 *n*2 belonging to each shift register 32 *n*1, a control input of the AND-circuit 32 n2 being activated by the output $b_n$ of the channel counter 48, when the shift register 32 n1 is connected for registering. Read-out of the information written into the buffer unit 32 *n* is made to an outgoing line *c'* in cyclic sequence through an AND-circuit 34 n1 belonging to each shift register 32 *n*1 under control of bit timing pulses which are supplied to the shift register 32 *n*1 from the bit timing generator 46 via an AND-circuit 34 *n*2. If read-out is to take place writing must not take place simultaneously which condition is fulfilled by means of a connection between an inhibition input of the AND-circuit 34 *n*1 and 34 *n*2 respectively and the output $b_n$ of the channel counter 48.

The read-out of the outgoing channels is controlled by the control circuit 35 by means of a channel counter 55 which has 121 outputs $b'_{0-120}$ of which one output $b'_n$ is connected to a control input in the AND-circuit 34 n1 and the AND-circuit 34 *n*2 respectively. The outputs $b'_{0-120}$ are activated in sequential order in such a dependence on the binary values which have been assigned to the marking bit in the first bit position in respective channels, that if the marking bit indicates a voltage level that is equal to zero-voltage, the channel counter 55 is stepped forward immediately while, if the marking bit indicates a voltage level that differs from zero-voltage, stepping forward occurs to the next channel first after a definite number of further bit positions, according to the example 8. For this purpose a flank triggered flip-flop register 56 is arranged that has a trigger input connected to a forward stepping input of the channel counter 55, the flip-flop register 56 being triggered at the beginning of each new channel to register the bit first supplied to the line *c'*, which is the marking bit, the purpose of the flip-flop register 56 being to maintain information on the marking bit during the duration of each channel. This information is fed to a first input of an exclusive-OR-circuit 57, a second input of which is fed with an activation signal which is obtained through an OR-circuit 58 upon activation of the even channels in the channel counter 55. The output of the exclusive-OR-circuit 57 is connected to an inhibition input in an AND-circuit 59 which through an OR-circuit 60 connects the bit timing generator 46 to a forward stepping input in the channel counter 55.

If the marking bit indicates zero-voltage and its nominal value on the input in the shift register 32 *n*1 thus has not been shifted by means of the exclusive-OR-circuit 53 in the logic circuit 50, no output signal is received from the output of the exclusive-OR-circuit 57 to inhibit the AND-circuit 59 connected between the bit timing generator 46 and the forward stepping input of the channel counter 55. Consequently the next-following bit timing pulse from the bit timing generator 46 is fed via the AND-circuit 59 and the OR-circuit 60 to the channel counter 55 and steps this forward to a new channel. The bit timing pulse on the output of the AND-circuit 59 also resets a bit counter 61. If, on the contrary, the marking bit indicates a voltage level that differs from zero-voltage and its nominal value thus upon registering into the shift register 32 n1 has been shifted in previously mentioned manner, an output signal is obtained from the exclusive-OR-circuit 57 to inhibit the AND-circuit 59. The bit counter 61 is then stepped forward by a determined number of bit timing pulses from the bit timing generator 46, according to the example 9, whereupon the bit counter 61 sends a pulse through the OR-circuit 60 to the channel counter 55 to step this forward to next channel and returns to its starting position.

On the output side there is besides the 120 transmission channels a synchronizing channel $b'_0$, during which a synchronizing word that is stored in a shift register 62 is supplied to the outgoing line *c'* through an AND-circuit 63 in dependence on that the output $b'_0$ of the channel counter 55 is activated and under control of the bit timing pulses which are fed to the shift register 62 from the bit timing generator 46 through an AND-circuit 64.

It can occur that the amount of information which shall be transferred within a frame is so large that the provided proportion between the respective bit timing frequencies for input and output from the buffer units 32 n makes the number of PCM-words that are read-out insufficient for transferring all the incoming information. Also in such a case the transfer of all the incoming information can be accomplished by reducing the word length in such a way that the least significant part of the incoming information is eliminated. Provided that the PCM-coding is such that the degree of significant information in the PCM-words decreases with increasing serial numbers of the bits, the word length can be reduced with for example the last 1, 2 or 3 bits. This can be achieved by counting the number of information carrying channels within a frame and reducing the length of the transmitted PCM-words, when said number exceeds a definite value. For this purpose the control circuit 35 includes a counter 65 which is stepped forward by the bit counter 61, when the latter steps forward the channel counter 55 to a new channel. When the channel counter 55 activates the synchronizing channel $b'_0$, the content of the counter 56 is read through an AND-circuit 66 to a register 67, the counter 65 being reset through a delay circuit 68. The content of the register 67 is decoded in a decoder 69 and the output signal of the decoder 69 controls the counting cycle of the bit counter 61, so that in dependence on the obtained counter result from the counter 65 the word length becomes for example 9, 8, 7 bits and so on.

FIG. 4 shows a logic diagram of the code converter 4 at the receiving terminal of the block diagram in FIG. 2. The transmitted PCM-flow is received via a line *c''* and is fed on the one hand to a bit timing regenerator 70 that is included in the previously mentioned control circuit 43 and is on the other hand fed through an AND-circuit 41 *n*1 belonging to the shift register 42 *n*1 that is arranged separately for each transmission channel in a buffer unit 42 n that according to the example comprises altogether 120 buffer units. A control input of the AND-circuit 41 n1 is connected to an output $b''_n$ of a channel counter 71 which according to the example has 121 outputs $b''_{0-120}$ which in sequential order are activated at forward stepping of the channel counter 71. Each buffer units 42 n is provided with an AND-circuit 41 n2 through which bit timing pulses from the bit timing regenerator 70 are fed to the shift register 42 n1 in order to control the input of the PCM-flow.

In the control circuit 43 a flank triggered flip-flop register 72 is included, a trigger input of which is connected to a forward stepping input of the channel counter 71 so that the flip-flop register 72 will be triggered at the start of each new channel for registration of the first received bit on the line *c''*, which is the marking bit. The value of the marking bit is kept by the flip-flop register 72 during the duration of the respective channels, and is fed from the flip-flop register 72 to a first input of an exclusive-OR-circuit 73 which through a second input obtains an activation signal through an OR-circuit 74 upon activation of the even channels of the channel counter 71. The output of the exclusive-OR-circuit 73 is connected to an inverting input of an AND-circuit 75 which through an OR-circuit 76 connects the bit timing generator 70 to the forward stepping input of the channel counter 71.

If the value of a received marking bit has not been shifted at the transmitting terminal by means of the exclusive-OR-circuit 53 in FIG. 3, that is the marking bit arrives without being accompanied by a subsequent PCM-word, no output signal is received from the output of the exclusive-OR-circuit 73 to inhibit the AND-circuit 75. Consequently, next bit timing pulse from the bit timing regenerator 70 is fed via the AND-circuit 75 and the OR-circuit 76 to the channel counter 71 and steps this forward to a new channel. The bit timing pulse on the output of the AND-circuit 75 is also fed via an OR-circuit 77 to a bit counter 78 in order to bring this back to a starting position. If on the contrary the value of the marking bit has been shifted on the sending end, that is the marking bit arrives accompanied by an information carrying PCM-word, an output signal is obtained from the exclusive-OR-circuit 73 to inhibit the AND-circuit 75. The bit counter 78 is then stepped forward by a definite number of bit timing pulses from the bit timing regenerator 70 whereupon the bit counter 78 sends a pulse through the OR-circuit 76 to the channel counter 71 to step this forward to the next channel and returns to its starting position.

In the PCM-flow received from the incoming line $c''$ the previously mentioned synchronizing word is identified by means of a synchronizing word detector 79 included in the control circuit 43. Upon detection of a synchronizing word the synchronizing word detector 79 generates an output signal which is supplied on the one hand to the channel counter 71 in order to set this for reception of channel 1, the output $b''_1$ being activated, and on the other hand via the OR-circuit 77 to the bit counter 78 in order to bring this to its starting position.

In the control circuit 43 a counter 80 is connected to the bit counter 78 and is stepped forward each time this sends a pulse through the OR-circuit 76 to the channel counter 71 to step this forward to a new channel. The counter result in the counter 80 is read-out each time the synchronizing channel $b''_0$ is activated and is fed via an AND-circuit 81 to a register 82 the counter 80 being reset through a delay circuit 83. The contents of the register 82 influences the bit counter 78 through a decoder 84 in such a way that the cycle of the bit counter 78 in dependence on the obtained counter result from the counter 80 becomes the same as the cycle of the bit counter 61 at the transmitting terminal.

As previously mentioned the marking bits with or without accompanying PCM-word are registered in their respective shift register 42 *n*1. For marking bits without accompanying PCM-words a PCM-word consisting of 8 zeros has to be reconstructed. Furthermore, when the transferred PCM-words include for example only 7 or 6 bits, measures must be taken to obtain that the reconstructed PCM-words again will include 8 bits. For this purpose a counter 41 *n*3 is arranged for each shift register 42 *n*1 the counter being reset upon activation of the output $b''_n$ of the channel counter and being stepped forward by the bit timing pulses from the bit timing regenerator 70 through an AND-circuit 41 *n*4. The counter 41 *n*3 is provided to count to nine after being reset and during this counting the counter 41 *n*3 generates on an output a binary zero signal until the ninth step when a binary one-signal is generated.

The output of the counter 41 n3 is via an inverting circuit 41 n5 connected to a control input at the AND-circuit 41 n2, through which the bit timing pulses of the bit timing generator 70 are brought to the shift register 42 *n*1. The output of the counter 41 *n*3 is furthermore via the inverting circuit 41 *n*5 connected to a control input of the AND-circuit 41 *n*4 so that, when a binary zero-signal at the ninth counterstep appears on the output of the counter 41 *n*3, the forward stepping of the counter 41 *n*3 is inhibited. Consequently, upon registering the shift register 42 *n*1 will always be stepped forward nine steps. If the activation of the output $b''_n$ of the channel counter 71 for example has ceased after 6 received bits, the counter 41 *n*3 shifts the contents of the shift register 42 *n*1 forward three further steps, whereby the marking bit is shifted out of the shift register 42 *n*1 and the two less significant bit positions are filled with the binary value 0.

The output of information from the buffer units 42 n is fed to an outgoing line $c'''$ through an AND-circuit 45 *n*1 belonging to each shift register 42 *n*1. A control input of the AND-circuit 45 *n*1 is connected to an output $b'''$ *n* of a channel counter 85 which is stepped forward by means of bit timing pulses from the bit timing regenerator 70 through a frequency multiplier 86 and a bit counter 87 counting to eight and which according to the example has 120 outputs $b'''_{1\text{-}120}$ being activated in sequential order when the counter 87 is stepped forward. The frequency multiplier 86 which corresponds to the frequency multiplier 47 at the transmitting terminal multiplies the bit timing frequency of the bit timing regenerator 70 with the factor 4 in order to obtain the bit timing frequency with which the PCM-encoder 2 at the transmitting terminal works. Each shift register 42 n1 is provided with an AND-circuit 45 n2 through which the bit timing pulses from the frequency multiplier 86 are fed to the shift register 42 n1 in order to control the output of its information content, a control input of the AND-circuit 45 *n*2 being activated by the output b'''*n* at the channel counter 85.

If read-out from the shift register 42 *n*1 is to take place, writing must not take place during the activation time for the output b'''*n* of the channel counter 85. This condition is fulfilled by means of a connection between a second control input of the AND-circuits 45 nl and 45 *n*2 respectively and the output of the counter 41 *n*3 through an AND-circuit 45 *n*3 a control input of which is connected to an output of a flank triggered flip-flop register 45 *n*4 which output is reset when the output of the counter 41 *n*3 is set and is set upon activation of the output b'''n of the channel counter 85. To the second control input of the AND-circuit 45 *n*1 and 45 *n*2 respectively a connection *f* is arranged, the purpose of which will appear in connection with the description of a modification of the invention.

Another possibility to reduce the redundancy at transmission of a telephone signal is obtained by defining the information content in a channel as redundant if is is unchanged relative to the information content in the same channel in the previous frame. In a method according to an embodiment of the invention when the same PCM-word is repeated, instead of the PCM-word only a marking bit is transmitted which indicates that a PCM-word with redundant information content has occurred and when the PCM-word is changed the new PCM-word is transmitted preceded by a marking bit, the value of which has been shifted in the previously mentioned manner. This method is explained by means of FIG. 5 and 6 which show the necessary additions in the logic diagrams according to FIG. 3 and 4.

FIG. 5 shows a logic diagram of a buffer unit 32'n at the transmitting terminal which shall replace the buffer unit 32 *n* in FIG. 3 in order to determine whether PCM-words with the same information content occur in the same channel in two successive frames. As it appears the shift register 32 *n*1 has been replaced by two shift registers 32 *n*3 and 32 *n*4 which are cascade connected in such a way that the information which during a frame is fed to the shift register 32 *n*3, during the subsequent frame is forwarded to the shift register 32 *n*4. The shift register 32 *n*3 includes 8 bit positions while the shift register 32 *n*4 includes 9 bit positions in order to be able to insert a marking bit in the bit position that is first transmitted. In the buffer unit 32'*n* in FIG. 5 an exclusive-OR-circuit 32 *n*5 is included which compares the bits in corresponding bit positions in the shift registers 32 *n*3 and 32 *n*4 with each other and which upon equality supplies on an output a binary zero-signal and upon a difference supplies a binary one-signal. Further an exclusive-OR-circuit 36 n6 is arranged which corresponds to the exclusive-OR-circuit 53 in the logic circuit 50 in FIG. 3 and has to task to execute an exclusive-OR-operation between the output signal of the exclusive-OR-circuits 32 *n*5 and the output signal which is obtained from a connection *d* to the output of the OR-circuit 54 in FIG. 3.

Upon equality between the PCM-words written in the two shift registers 32 *n*3 and 32 *n*4 there is obtained on the output of the exclusive-OR-circuit 32 *n*6 a binary value similar to the binary value at the terminal d, while upon in equality between the PCM-words a complementary binary value of the binary value at the terminal *d* is obtained. The binary value of the output of the exclusive-OR-circuit 32 *n*6 is fed to the shift register 32 *n*4 through an AND-circuit 32 *n*7, and into the bit position the bit value of which is first read-out, a control input of the AND-circuit 32 *n*7 being connected to the output $b_n$ of the channel counter 48. According to the modification shown in FIG. 5 the logic circuit 50 of control circuit 33 is eliminated.

FIG. 6 shows a logic diagram of a bufer unit 42'*n* which replaces the buffer unit 42 *n* in FIG. 4. The bit timing pulses from the AND-circuit 41 *n*2 in FIG. 4 are fed to a shift register 42'*n*1 through a delay circuit 42 *n*2 and an AND-circuit 42 *n*3, a control input of which being via a lead *c* connected to the output of the exclusive-OR-circuit 73 in FIG. 4. The incoming PCM-flow is fed to the shift register 42'*n*1 in the same way as is described in connection with FIG. 4.

In the buffer unit 42'*n* in FIG. 6 an AND-circuit 42 n4 is further arranged which receives the output signal of the shift register 42'n1 and feeds it back to the input of the shift register 42'n1 in dependence on the fact that the output *b'''n* of the channel counter 85 as well as the previously mentioned connection *f* are activated. In this way a non-destructive and thus repeatable output is obtained from the shift register 42'*n*1. A condition that must be fulfilled if the repeated output is to take place is that when the output *b''n* from the channel counter 71 is activated for writing into the shift register 42'*n*1, no activation signal from the exclusive-OR-circuit 73 in FIG. 4 shall appear at the terminal *e* of the AND-circuit 42 *n*3. The writing of a new PCM-word into the shift register 42'*n*1 occurs in such a way that the exclusive-OR-circuit 73 via connection *e* activates the AND-circuit 42 *n*3, so that the bit timing pulses from the AND-circuit 41 *n*2 are fed to the shift register 42'*n*1, whereby the circulating information in the register 42'*n*1 is erased.

The definition of the information content in a PCM-word as redundant if it is unchanged relatively the preceding PCM-word is very applicable when transmitting TV-signals in a PCM-system. On a TV-line there is a high probability that adjacent picture elements have the same light intensity. If thus PCM-words are used for the transmission of information concerning the light intensity of the respective picture element a number of subsequent PCM-words will with a large probability be equal which means that the same principle can be used for the transmission of TV-signals which have been described here above in connection with transmission of telephone signals. The possibility to use the system in the block diagram according to FIG. 2 for transmitting TV-signals is indicated at the transmitting terminal in FIG. 2 with broken lines to a connection u for input of a TV-signal at the receiving terminal and with broken lines to a connection *v* for output of the TV-signal.

In order to be able to explain the function of the system for transmitting TV-signals more in detail FIG. 7 and 8 show the parts which need to be replaced or to be completed in the logic diagrams according to FIG. 3 and 4. FIG. 7 shows a logic diagram of a logic circuit 88 which at the transmitting terminal replaces the logic circuit 50 in FIG. 3 and has the task to determine whether a PCM-word has the same information content as the preceding PCM-word or not. As it appears the shift register 51 has been replaced of two cascade connected shift registers 89 and 90, the respective number of bit positions of which correspond to the word length which is to be transferred and which for a TV-application can be essentially shorter than for the telephony application, for example equal to four bits.

In the logic diagram 88 an exclusive-OR-circuit 91 is included which compares the bits in respective bit positions in the shift registers 89 and 90 with each other and at agreement generates a binary zero-signal and at difference generates a binary one-signal on an output. Further an exclusive-OR-circuit 92 is arranged which corresponds to the exclusive-OR-circuit 53 in the logic circuit 50 in FIG. 3 and has to task to execute an exclusive-OR-operation between the output signal of the exclusive-OR-circuit 91 and the output signal which is received from the terminal *d* connected to the output of the OR-circuit 54 in FIG. 3. From the output of the exclusive-OR-circuit 92 a binary signal is chosen the value of which in the same way as previously has been described is fed to a buffer unit 32''n corresponding to the buffer unit 32 n in FIG. 3 and is written via an AND-circuit 32''n2 into a shift register 32''n1 and there forms the marking bit.

FIG. 8 shows a logic diagram for a buffer unit 42'' *n* which replaces the buffer unit 42 *n* in FIG. 4 the receiving terminal in FIG. 4 being completed with a logic circuit 93. The received PCM-flow is fed from the incoming line *c''* in Fig. 4 to a shift register 94 arranged in the logic circuit 93 under control of bit timing pulses from the bit timing regenerator 70, the bit timing pulses being supplied to the shift register 94 through a delay circuit 95 and an AND-circuit 96. In a corresponding way the bit timing pulses from the AND-circuit 41 *n*2 in FIG. 4 are fed to a shift register 42 *n*5 arranged in the buffer unit 42''*n* through a delay circuit 42 *n*6 and an AND-circuit 42 *n*7. The AND-circuits 96 and 42 *n*7 have each a control input connected via terminal *e* to the output of the exclusive-OR-circuit 73 in FIG. 4, so that they are activated only when the received marking bit indicates that it is followed by an information carrying PCM-word. If the marking bit indicates that it is not followed by an information carrying PCM-word, the writing is inhibited in the shift registers 94 and 42 *n*5. The purpose of the delay circuits 95 and 42 *n*6 is to delay the bit timing pulses to the AND-circuits 96 and 42*n*7 respectively in sufficient degree to enable the latter to be inhibited by the output signal of the exclusive-OR-circuit 73 in the terminal *e* before the timing pul-arrive.

In the logic circuit 93 an AND-circuit 97 is included for transferring the in in the shift register 94 to the shift register 42 n5 in the buffer unit 42''*n* through an AND-circuit 42 n8 included the latter. The AND-circuits 97 and 42 *n*8 have each an inhibition input connected with the terminal *e*, the AND-circuit 42 *n*8 also having a control input connected to the output b''n of the channel counter 71. When the output of the exclusive-OR-circuit 73 at the terminal *e* indicates that the received marking bit is not followed by a PCM-word, the writing is inhibited to the shaft registers 94 and 42 *n*5 and the last PCM-word written into the shift register 94 is transferred through the now opened AND-circuit 97 and 42 *n*8 to the shift register 42 *n*5. When a received marking bit indicates that it is followed by a PCM-word the AND-circuits 97 and 42 *n*8 are inhibited and the writing from the incoming line *c''* takes again place in the shift registers 94 and 42 *n*5.

A further possibility to reduce the necessary band-width for an information transmission according to the invention is based on the fact that a PCM-signal occupies larger band-width than its corresponding analog signal. This fact can be utilized in such a manner that a PCM-signal formed at the transmitting terminal in which signal redundant information in an original PCM-signal is eliminated by a code conversion according to the principle of the invention, is changed to an analog signal for transmission in analog form, at the receiving terminal the received analog signal being changed to a PCM-signal which is code converted according to the principle of the invention in order to restore said redundant information and thereby regenerate the original PCM-signal at the transmitting terminal. This is indicated schematically in FIG. 9 which shows a transmission system which includes a transmitting terminal where an analog signal arrives on an input *n* and is delivered to a PCM-encoder 101 the output signal of which is fed via a code converter 102 of the type which is described in connection with FIG. 3 to a PCM-decoder 103, the analog output signal of which is supplied to a transmission medium and a receiving terminal where a PCM-encoder 104 changes the analog signal transferred from the transmitting terminal to a PCM-signal which is fed via a code converter 105 of the type which is described in connection with FIG. 4 to a PCM-decoder 106 from which an analog signal corresponding to the original analog signal on the transmitting terminal is supplied on an output *m*. A condition that must be fulfilled if this transmission method is to function is that the transmission medium is phase linear.

I claim:

1. In a PCM-word transmission system, the method for increasing for a signal of given bandwidth the amount of information transferred per unit time comprising the steps of: at a transmitting terminal converting the signal to PCM-words in a first PCM-word format, examining the information content of the PCM-words in order to classify the PCM-words according to a preselected rule in a first category with low information value or in a second category with high information value, assigning to the PCM-words classified in the first category first marking bits having a first bit pattern and assigning to the PCM words classified in the second category second marking bits having a second bit pattern, for PCM-words in the first category transmitting only the assigned first marking bits in a second PCM-word format while for PCM-words in the second category transmitting both such PCM-words and their assigned second marking bits in a third PCM-word format; and at a receiving terminal examining the received marking bits to determine whether the received marking bits are to first or second marking bits, for each of said first marking bits generating a PCM-word of the first category but in the first PCM-word format, and for each of said second marking bits converting its associated PCM-word of the second category into a corresponding PCM-word of the second category but in the first PCM-word format.

2. Method according to claim 1 wherein said first bit pattern is formed by assigning PCM-words having odd serial numbers in a PCM-frame a marking bit with a first binary value and PCM-words with even serial numbers in such PCM-frame a marking bit with a second binary value and that said second bit pattern is formed by shifting the value of the marking bit.

3. Method according to claim 1 wherein the rule for classifying the PCM-words is that PCM-words which represent a given voltage level are classified in said first category and PCM-words which represent a voltage level that differs from said given voltage level are classified in said second category.

4. Method according to claim 1 wherein the rule for classifying PCM-words is that PCM-words with information content that is equal to the information content in a previous PCM-word are classified in said first category and PCM-words with information content that differs from the information content in a previous word are classified in said second category.

5. The method according to claim 4 wherein the previous PCM-word is the PCM-word in the same frame but in a different channel.

6. The method according to claim 4 wherein the previous PCM-word is the PCM-word in the same channel but in an earlier frame.

7. Method according to claim 1 further comprising the steps of at the transmitting terminal counting the number of PCM-words of the second category transmitted during a selected time period, and reducing the third PCM-word format to a number of most significant bit positions in dependence on the counted number of PCM-words, and that at the receiving terminal, regenerating the selected time period and converting the PCM-words received during said time period in the second PCM-word format to PCM-words in the original first PCM-word format.

8. Method according to claim 7 wherein at the receiving terminal the counting of the number of PCM-words of the second category during said regenerated time period is performed in order to obtain information about the introduced degree of reduction in the second PCM-word format to determine how many bit positions are required to fill out the reduced PCM-words.

9. Method according to claim 7 wherein at the transmitting terminal a PCM-word is supplied with information about the degree of reduction in the second PCM-word format and at the receiving terminal utilizing such information to determine how many bit positions are required to fill out the reduced PCM-words.

10. Method according to claim 1 characterized in that at the transmitting terminal the PCM-words in the second and third PCM-word format are converted into an analog signal for transmission to the receiving terminal and that at the receiving terminal the PCM-words in the second and third PCM-words format are regenerated from the analog signal transferred from the transmitting terminal.

* * * * *